(12) United States Patent
Artemev (10) Patent No.: US 9,731,783 B2
(45) Date of Patent: Aug. 15, 2017

(54) POWERED UNICYCLE DEVICE

(71) Applicant: Timur Artemev, Haslemere Surrey (GB)

(72) Inventor: Timur Artemev, Haslemere Surrey (GB)

(*) Notice: Subject to any disclaimer, the term of this patent is extended or adjusted under 35 U.S.C. 154(b) by 0 days.

(21) Appl. No.: 15/021,894

(22) PCT Filed: Feb. 2, 2015

(86) PCT No.: PCT/GB2015/050271
§ 371 (c)(1),
(2) Date: Mar. 14, 2016

(87) PCT Pub. No.: WO2015/166202
PCT Pub. Date: Nov. 5, 2015

(65) Prior Publication Data
US 2016/0325801 A1    Nov. 10, 2016

(30) Foreign Application Priority Data
May 2, 2014    (GB) .................................. 1407825.7

(51) Int. Cl.
*B62K 1/00* (2006.01)
*B60L 3/10* (2006.01)
(Continued)

(52) U.S. Cl.
CPC .............. *B62K 1/00* (2013.01); *B60K 7/0007* (2013.01); *B60L 3/106* (2013.01); *B60L 11/005* (2013.01);
(Continued)

(58) Field of Classification Search
CPC ........ B62K 1/00; B62K 3/007; B62K 11/007; B62K 2204/00
See application file for complete search history.

(56) References Cited

U.S. PATENT DOCUMENTS 4,109,741 A * 8/1978 Gabriel .................... B62K 1/00
                                                            180/21
8,356,681 B2 * 1/2013 Gomi .................... B60B 19/003
                                                            180/20
(Continued)

FOREIGN PATENT DOCUMENTS

CN    101172512 A    5/2008
CN    101269683 A    9/2008
(Continued)

OTHER PUBLICATIONS

Search Report for United Kingdom Patent Application No. GB1407825.7, dated Sep. 23, 2014, 3 pages.
(Continued)

*Primary Examiner* — J. Allen Shriver, II
*Assistant Examiner* — Steve Clemmons
(74) *Attorney, Agent, or Firm* — Withrow & Terranova, P.L.L.C.; Vincent K. Gustafson (57) ABSTRACT

A self-balancing powered unicycle device (100) having a single hubless wheel is disclosed. The self-balancing powered unicycle device comprises: a single wheel (120); a motor adapted to drive the wheel; a balance control system adapted to maintain fore-aft balance of the unicycle device; at least one foot platform (165) for supporting a user of the unicycle device; and a casing (110) adapted to cover at least a portion of the outer rim of the wheel. The self-balancing powered unicycle device further comprises at least one energy storage device compartment (150A, 150B) protruding outward from a side of the casing (110) and adapted to house an energy storage device for powering the unicycle device.

6 Claims, 5 Drawing Sheets

(51) Int. Cl.
  *B60L 11/00* (2006.01)
  *B60L 11/18* (2006.01)
  *B60L 15/20* (2006.01)
  *B62K 11/00* (2006.01)
  *B60K 7/00* (2006.01)
  *B62J 25/00* (2006.01)
  *B62M 6/90* (2010.01)

(52) U.S. Cl.
  CPC .......... *B60L 11/18* (2013.01); *B60L 11/1864* (2013.01); *B60L 11/1877* (2013.01); *B60L 11/1879* (2013.01); *B60L 15/20* (2013.01); *B62J 25/00* (2013.01); *B62K 11/007* (2016.11); *B60L 2200/14* (2013.01); *B60L 2200/16* (2013.01); *B60L 2220/44* (2013.01); *B60L 2220/50* (2013.01); *B60L 2240/421* (2013.01); *B60L 2240/423* (2013.01); *B60L 2260/34* (2013.01); *B62M 6/90* (2013.01); *Y02T 10/641* (2013.01); *Y02T 10/645* (2013.01); *Y02T 10/7005* (2013.01); *Y02T 10/7022* (2013.01); *Y02T 10/7061* (2013.01); *Y02T 10/72* (2013.01); *Y02T 10/7275* (2013.01)

(56) References Cited

U.S. PATENT DOCUMENTS

| | | | | |
|---|---|---|---|---|
| 8,443,920 | B2* | 5/2013 | Gomi | B62J 1/005 180/21 |
| 8,807,250 | B2* | 8/2014 | Chen | B62K 1/00 180/21 |
| 9,517,806 | B2* | 12/2016 | Ungar | A63C 17/006 |
| 2011/0220427 | A1 | 9/2011 | Chen | |

FOREIGN PATENT DOCUMENTS

| | | |
|---|---|---|
| CN | 101417682 A | 4/2009 |
| CN | 103407529 A | 11/2013 |
| CN | 203372330 U | 1/2014 |
| CN | 103723225 A | 4/2014 |
| CN | 203806063 U | 9/2014 |
| JP | 2012096595 A | 5/2012 |

OTHER PUBLICATIONS

International Search Report (Form PCT/ISA/210) and Written Opinion (Form PCT/ISA/237) for International Patent Application No. PCT/GB2015/050271, mailed May 8, 2015, 14 pages.

Notification of Grant for United Kingdom Patent Application No. GB1407825.7 (issued as United Kingdom Patent No. GB2525677), mailed Feb. 16, 2016, 2 pages.

* cited by examiner

POWERED UNICYCLE DEVICE

CROSS-REFERENCE TO RELATED APPLICATIONS

This application is a 35 U.S.C. §371 national phase filing of International Application No. PCT/GB2015/05027 filed Feb. 2, 2015, and claims the benefit of United Kingdom Patent Application No. 1407825.7 filed May 2, 2014. The entire disclosures of International Application No. PCT/GB2015/050271 and United Kingdom Patent Application No. 1407825.7 are hereby incorporated by reference herein in their respective entireties.

FIELD OF INVENTION

The present invention relates to powered single-wheeled devices and more particularly to powered unicycles with self-balancing functionality.

BACKGROUND TO THE INVENTION

Powered self-balancing vehicles for use while standing are known. Such vehicles include two-wheeled vehicles and single-wheeled vehicles (i.e. unicycles).

In a powered self-balancing unicycle, an electronic or mechanical system that controls the wheel in the appropriate direction is typically used to achieve fore-and-aft balance. This type of automatic fore-and-aft balance technology is well known and described, for example, in U.S. Pat. No. 6,302,230. A sensor and electronic equipment are typically provided. Information detected by the sensor and the electronics is relayed to a motor. The motor drives the wheel in the appropriate direction and at sufficient speed to maintain fore-and-aft balance.

Known embodiments of a powered self-balancing unicycle do not include a handle bar supported by a shaft. For example, U.S. patent application Ser. No. 12/281,101 presents a single wheel, coupled to a frame to which two platforms (one on each side of the wheel) are attached.

SUMMARY OF THE INVENTION

According to a first aspect of the invention, there is provided a self-balancing powered unicycle device according to claim 1.

For the avoidance of doubt, reference to a single wheel should be taken to mean the generally circular unit that is positioned between the legs of a user and adapted to rotate about an axis to propel the unicycle in a direction during use. The single wheel may therefore be formed from one or more tyres and/or hubs that are coupled together (via a differential, for example). For example, an embodiment may comprise a single hubless wheel having a single hubless rim with a plurality of separate tyres fitted thereon. Alternatively, an embodiment may comprise a single hubless wheel formed from a plurality of hubless rims (each having a respective tyre fitted thereon), wherein the plurality of hubless rims are coupled together via a differential bearing arrangement. A yet further embodiment may comprise a single wheel having a single rim and hub with a plurality of separate tyres fitted thereon. An even yet further embodiment may comprise a single wheel formed from a plurality of hubs and rims (each having a respective tyre fitted thereon), wherein the plurality of hub and rims are coupled together via a differential bearing arrangement.

There is proposed a self-balancing powered unicycle comprising a casing which may enable the powering device (such as a battery, for example) to be positioned outside of the rotating wheel, thereby enabling the wheel and/or the powered unicycle to be made slimmer than conventional self-balancing powered unicycles.

In other words, by catering for placement of an energy storage device outside the plane of the single wheel, the lateral extent of the wheel may be minimised. Also, the energy storage device compartment of the casing may provide a larger space for accommodating a larger energy storage device than conventional self-balancing powered unicycles. Embodiments may therefore employ a larger, more powerful energy storage device without needing to increase in the width of the wheel.

By housing an energy storage device in a compartment or storage part/section of the casing, the energy storage device may be protected from damage, water and/or dust despite being positioned exterior to the single rotating wheel.

The at least one energy storage device compartment may be adapted to be removable from the casing so as to enable removal of an energy storage device from the unicycle device. Embodiments may thus provide an energy storage arrangement which can be quickly and easily connected or removed to/from the unicycle for repair or replacement, for example. Also, by being adapted to be removable from the casing, embodiments may be dismantled to reduce the overall size or profile of the unicycle, thereby improving portability.

Embodiments may provide a self-balancing powered unicycle that is modular in nature. The at least one energy storage device compartment may be easily engaged and disengaged to/from the wheel to facilitate rapid and simple repair or replacement.

The energy storage device compartment may be shaped such that its width increases with distance from the rotational axis of the single wheel. Such a shape may help to reduce, minimise or prevent contact of a user's legs (e.g. knees and/or calves) with the casing and/or protruding compartment during general use. In particular, it is noted that when manoeuvring (e.g. turning) a powered unicycle device (such as an embodiment of the invention), the user will typically move and/or tilt their legs fore or aft. The sharper or greater the turn the more the legs may move or tilt. By arranging the shape of the protruding energy storage device compartment to increase in width or size with distance from the rotational axis of the single wheel, the size of the protruding energy storage device compartment can be maximised whilst reducing, minimising or preventing its contact with user's legs during use. In other words, the shape and lateral extent of a protruding energy storage device compartment may be adapted to avoid or reduce contact with a user's leg during use, yet still be of maximum size so as to house a large energy storage device. Embodiments may also enable sharper turns to be made by a user. When a user manoeuvres the unicycle device, the user may tilt or move their leg(s) fore/aft ahead/behind the energy storage device compartment, whilst the energy storage device compartment is shaped so that the separation between the leg and compartment is reduced towards a minimum (to maximise the size of the compartment). The increase in width of the energy storage device compartment with distance from the rotational axis of the single wheel may not be linear, and so, in some embodiments, the energy storage device compartment may have curved sides or edges when viewed from a side of the unicycle device.

In an embodiment, the at least one energy storage device compartment may be V-shaped, with the vertex or narrower end of the V-shape pointing towards the rotational axis of the single wheel. In other embodiments, the at least one energy storage device compartment may be trapezoidal in shape (e.g. a trapezium) or kite-shaped.

Also, in some embodiments, the at least one energy storage device compartment may extend beyond the circumferential extent of the generally circular casing, thus meaning that the size of the at least one energy storage device compartment is not generally restricted by the circumference of the wheel or casing.

In other embodiments, however, the at least one energy storage device compartment may not extend beyond the circumferential extent of the generally circular casing so as to reduce the overall size the unicycle. In such embodiments, the size of the at least one energy storage device compartment may be generally restricted by the circumference of the wheel or casing.

An outwardly facing surface of the at least one energy storage device compartment may comprise a yielding material. Such yielding material may be chosen so as to provide friction with a ground surface and thereby restrict or reduce a sliding movement of the unicycle device across the ground (if a user falls from the unicycle for example). An exemplary yielding material may comprise a rubberised or polymer-based material for example.

An outwardly facing surface of the at least one energy storage device compartment may therefore perform multiple functions, including the protection of a housed battery, and/or the provision of grip between the side of the unicycle device and the ground/floor surface (to prevent the unicycle from sliding along the ground/floor in an accident for example). The at least one energy storage device compartment may thus provide for improved safety and protection of an energy storage device housed therein.

The energy storage device may comprise at least one of: an electrical battery; an electrochemical battery, a capacitor, and a mechanical energy storage device; and a capacitor.

BRIEF DESCRIPTION OF THE DRAWINGS

An example of the invention will now be described with reference to the accompanying diagrams, in which.

DETAILED DESCRIPTION

Figure 1:
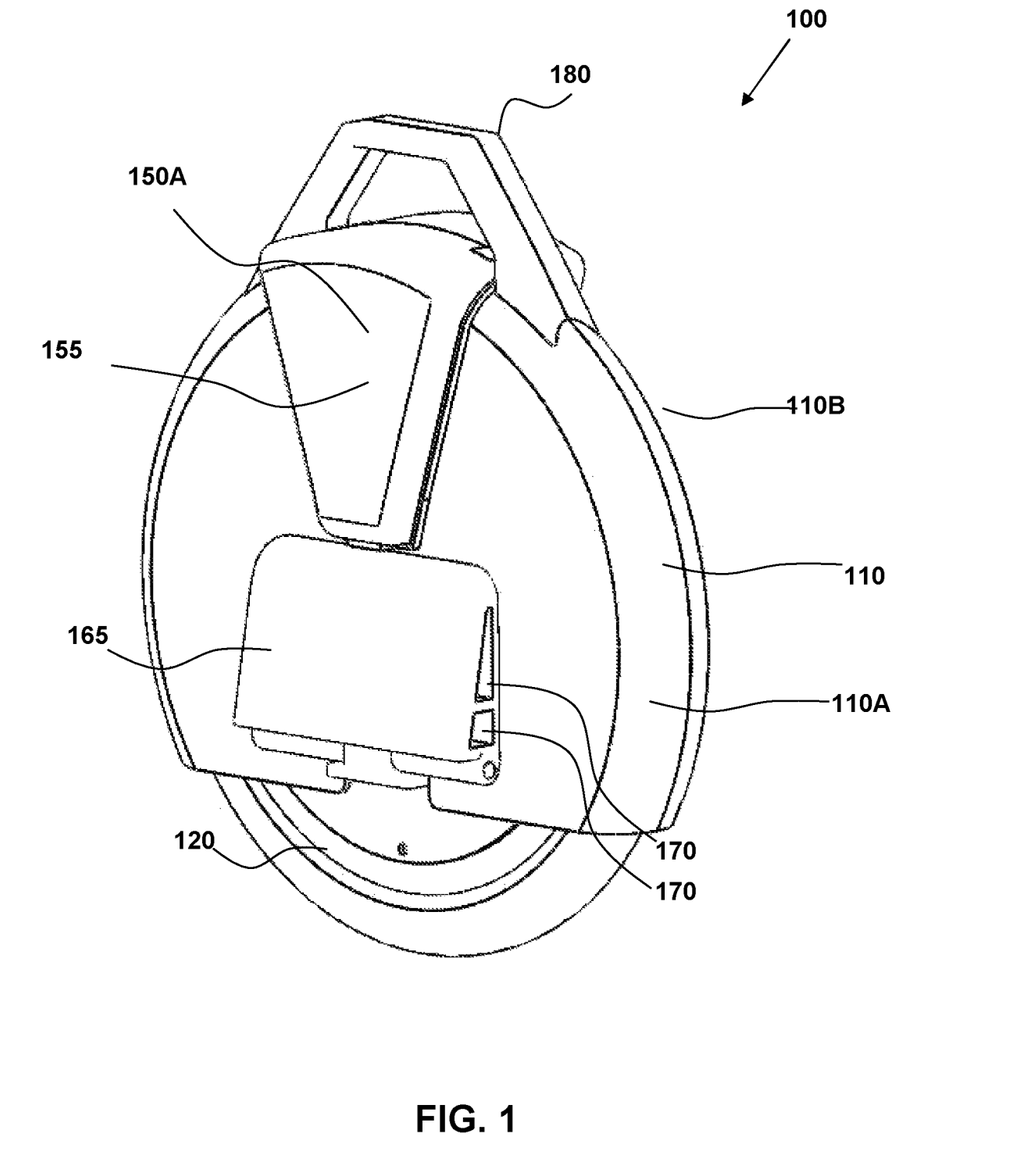
FIG. 1 is an isometric view of an embodiment of a powered unicycle device.
Figure 2:
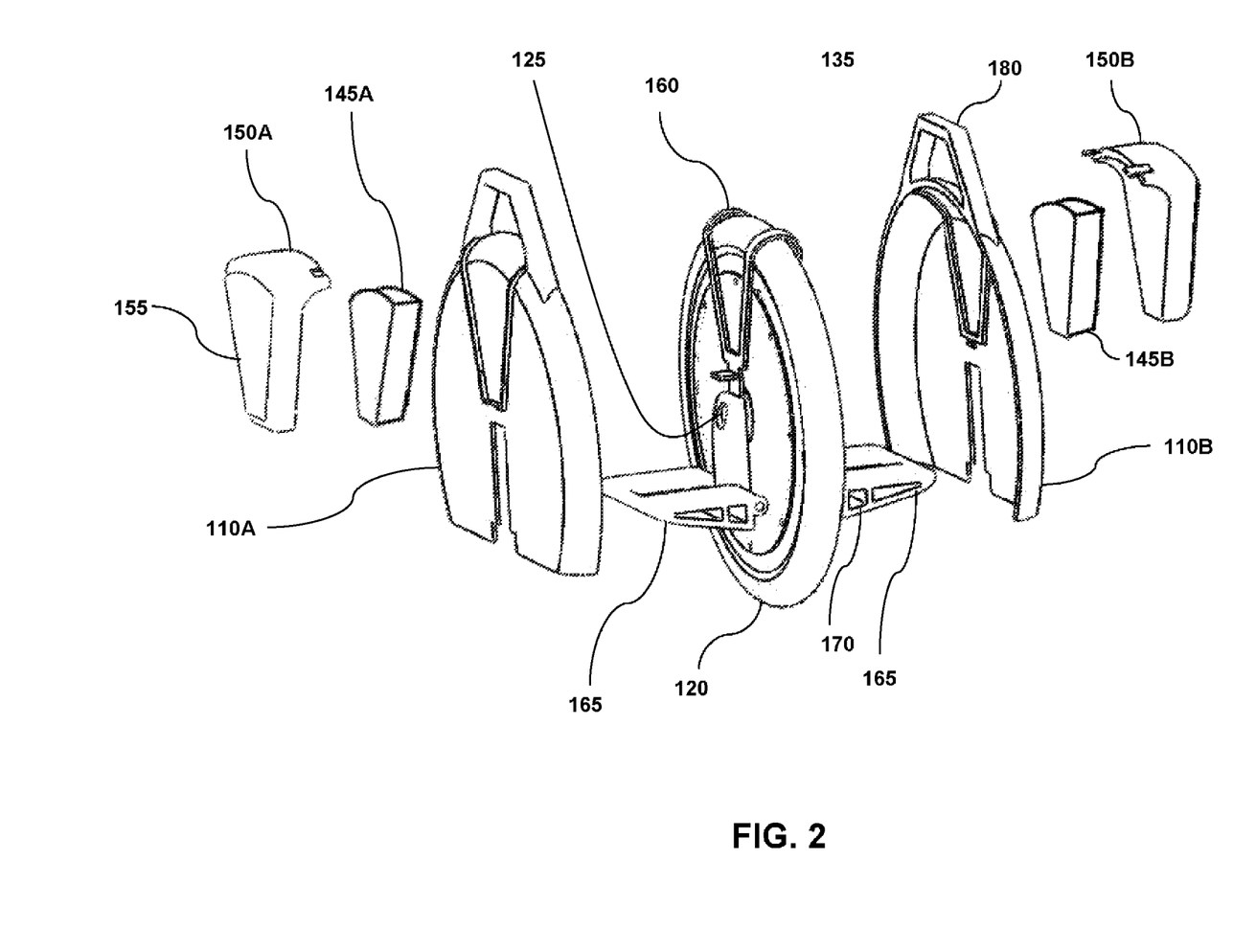
FIG. 2 is an exploded diagram of the powered unicycle device of FIG. 1.
Figure 3:
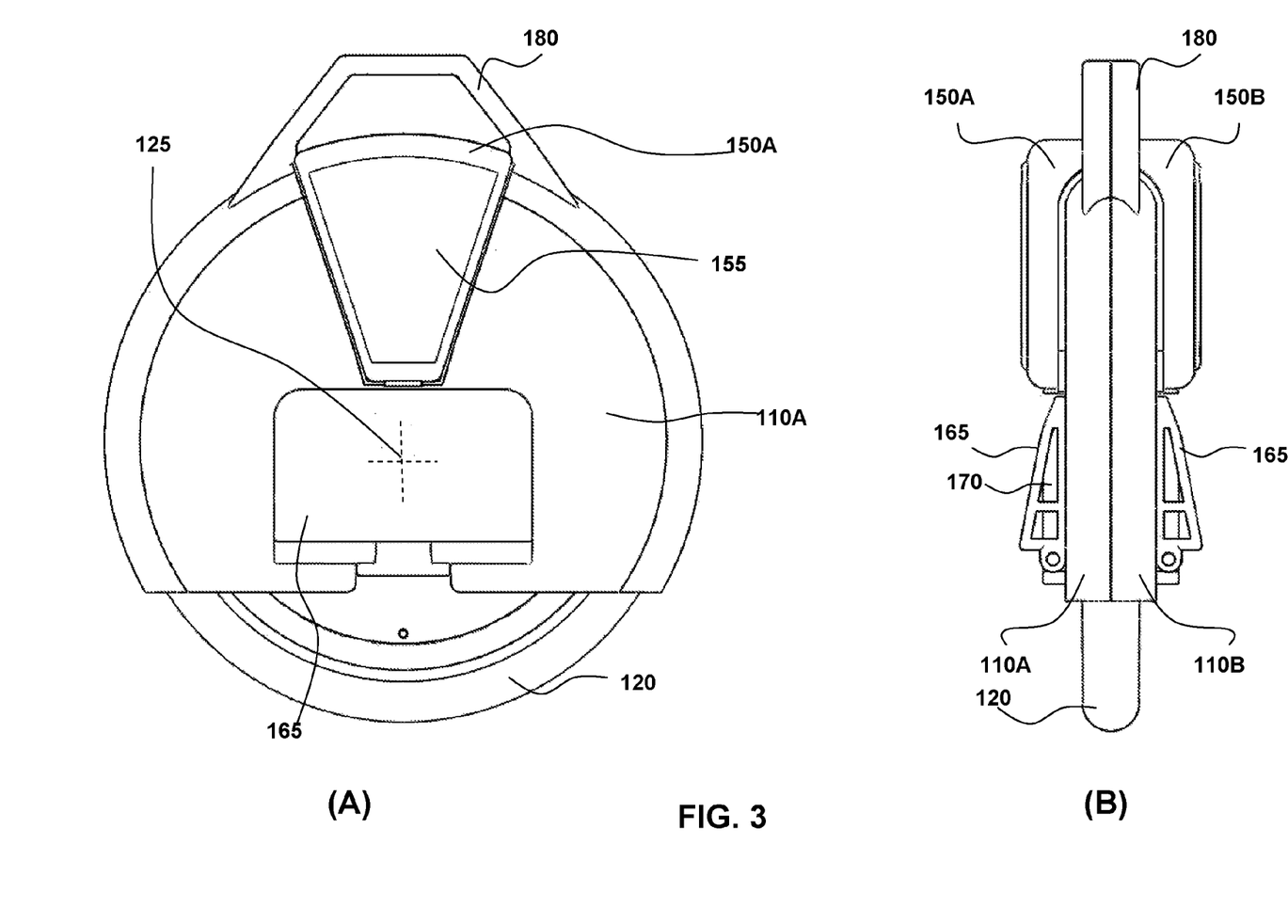
FIGS. 3A & 3B are side and front elevations, respectively, of the embodiment of FIG. 1.

FIGS. 1-3 show one embodiment of a powered unicycle device 100. FIG. 1 shows the powered unicycle device 100 with a casing 110 which covers a significant portion (e.g. more than half) of the wheel 120. Here, the casing 110 is formed from a first, left portion 110A that covers a significant portion of the left half of the wheel 120, and a second, right portion 110B that covers the a significant portion of the right half of the wheel 120. FIG. 2 illustrates internal components of the unicycle device 100, namely a wheel 120 (which spins about a central axis 125) and drive arrangement 135.

Referring back to FIG. 1, the casing 110 is retained in a fixed position relative to the central axis 125.

Referring now to FIG. 2, rotation of the single wheel 120 is driven by a drive arrangement 135 according to an embodiment. The drive arrangement 135 includes pairs of guide wheels (not visible) attached to the rim of the drive arrangement 135. A rib (not visible) is provided around the inner rim of the wheel 120 and fits into a gap between the guide wheels of each pair. The guide wheels are therefore adapted to contact with the inner rim of wheel 120 where they spin along with wheel 120 and hold wheel 120 in place by way of the rib. Of course, it will be appreciated that other arrangements, including those with only one guide wheel, are possible. For powering the drive arrangement 135, first 145A and second 145B batteries are provided in first 150A and second 150B battery compartments of the casing, respectively.

When fitted to the casing 110, as depicted in FIG. 1), the battery compartments 150A, 150B protrude outwardly from the side of the casing 110 and adapted to house a battery for powering the unicycle device. Thus, the casing 110 is adapted to enable the batteries 145A,145B to be positioned outside of the rotating wheel (and thus external to the drive arrangement 135), thereby enabling the wheel to be slimmer. In other words, by catering for placement of a batteries 145A,145B outside the plane of the single wheel 120, the lateral extent of the wheel may be minimized. Also, the battery compartments 150A,150B may be adapted to provide a larger space for accommodating bigger batteries than conventional self-balancing powered unicycles. The depicted embodiment may therefore employ larger, more powerful batteries than conventional self-balancing powered unicycles whilst maintaining or reducing the width of the wheel.

The first 150A and second 150B battery compartments house first 145A and second 145B batteries, respectively. The battery compartments thus protect the batteries from damage, water and/or dust.

The batteries 145A,145B are adapted to power a motor (of the drive arrangement) which drives one or more drive wheels (not visible) positioned at the lowermost point along the inner rim of the wheel 120. The batteries 145A,145B are adapted to electrically connect to a metal framework 160 which is adapted to conduct electrical energy to supply power to a motor of the unicycle device 100. In this embodiment, there are two batteries in order to create a balanced distribution of volume and weight. However, it is not necessary to employ two batteries 145A,145B. Also, alternative energy storage arrangements may be used, such as capacitors, and other known power storage devices, for example.

In this example, the first 150A and second 150B battery compartments are shaped such their width (when viewed from the side of the unicycle device, as in FIG. 3A) increases with distance from the rotational axis 125 of the single wheel 120. In other words, the battery compartments 150A, 150B are trapezoidal or generally V-shaped, with the narrow end pointing towards the rotational axis 125 of the single wheel 120. This shaping of the battery compartments is designed to reduce, minimize or prevent contact of a user's legs (e.g. knees and/or calves) with the casing 110 and/or protruding compartments 150A,150B during general use of the unicycle device 100.

In particular, it is noted that when turning a powered unicycle device (such as an embodiment of the invention), the user will typically tilt or move their legs forwards or backwards. The sharper or greater the turn, the more the legs may tilt or move forwards or backwards. By arranging the shape of the protruding battery compartments 150A,150B be of larger width or size towards an end furthest away from the rotational axis 125 of the wheel 120, the size of the protruding battery compartment may be maximized whilst reducing, minimizing or preventing its contact with user's legs during use. In other words, the shape and lateral extent of a protruding battery compartment 105A,150B is adapted to avoid or reduce contact with a user's leg during use, yet still be of maximum size so as to house a large battery 145A,145B.

When a user manoeuvres the unicycle device 100, the user may tilt or move their legs forwards or backwards ahead or behind the battery compartment, whilst the battery compartments 150A,150B are shaped so that the separation between the user's leg and a battery compartment 150A,150B is reduced towards a minimum (so as to maximize its size).

The outwardly facing surface of each battery compartment 150A,150B is provided with a yielding material 155 thereon. The yielding material 155 is of this example is chosen so as to provide friction with a ground surface and thereby restrict or reduce a sliding movement of the unicycle device across the ground (if a user falls from the unicycle for example). Here, yielding material 155 comprises a rubberised or polymer-based material.

The outwardly facing surface of each battery compartment 150A,150B therefore perform multiple functions, including the protection of a battery housed therein, and the provision of grip between the side of the unicycle device 100 and the ground/floor surface (to prevent the unicycle from sliding along the ground/floor in an accident for example).

The wheel 120 is hubless and the drive arrangement 135 is adapted to be fitted inside the wheel. In other words, the drive arrangement is sized and shaped so that it can be positioned in the void define by the inner rim of the hubless wheel 120.

Two foot platforms 165 are coupled to the axle 125 of the wheel, wherein a platform 165 is situated on either side of wheel 120. The foot platforms 165 are movable between a stowed configuration, wherein the foot platforms are substantially parallel with the plane of the wheel (as shown in FIGS. 1 & 3), and an active configuration, wherein the foot platforms are substantially perpendicular to the plane of the wheel (as shown in FIG. 2) so as to support a user's weight. Thus, in this embodiment, the foot platforms 165 are movable between: (i) a stowed configuration wherein they are flat against the side of the wheel; and (ii) an active configuration, wherein they project outwardly from the side of the wheel to provide a support surface for the feet of a user. Accordingly, the foot platforms 165 are upwardly foldable into a stowed configuration that narrows the profile of the unicycle 100 to aid in storage and carrying. In use, the foot platforms are moved to the active configuration, and the user stands with one foot on each platform 165.

The foot platforms 165 are formed with removed portions (or voids) 170 for reduced weight.

The drive arrangement 135 includes a gyroscope or accelerometer system (not shown) which senses forward and backward tilt of the device in relation to the ground surface and regulates the motor accordingly to keep the device upright. In this way, the user is provided a way of controlling the acceleration and deceleration of the unicycle by varying the pressure applied to various areas of the foot platforms 165. It also enables the unicycle to self-regulate its balance in the fore-and-aft plane.

The casing 110 of the embodiment of FIGS. 1-3 also comprises a lifting handle 180. The lifting handle 180 is positioned at the top of the casing 110, above the wheel 120, and may be used to hold the unicycle 100 above the ground, for example to enable a user to lift, carry, convey or place the unicycle 100.

Figure 4:
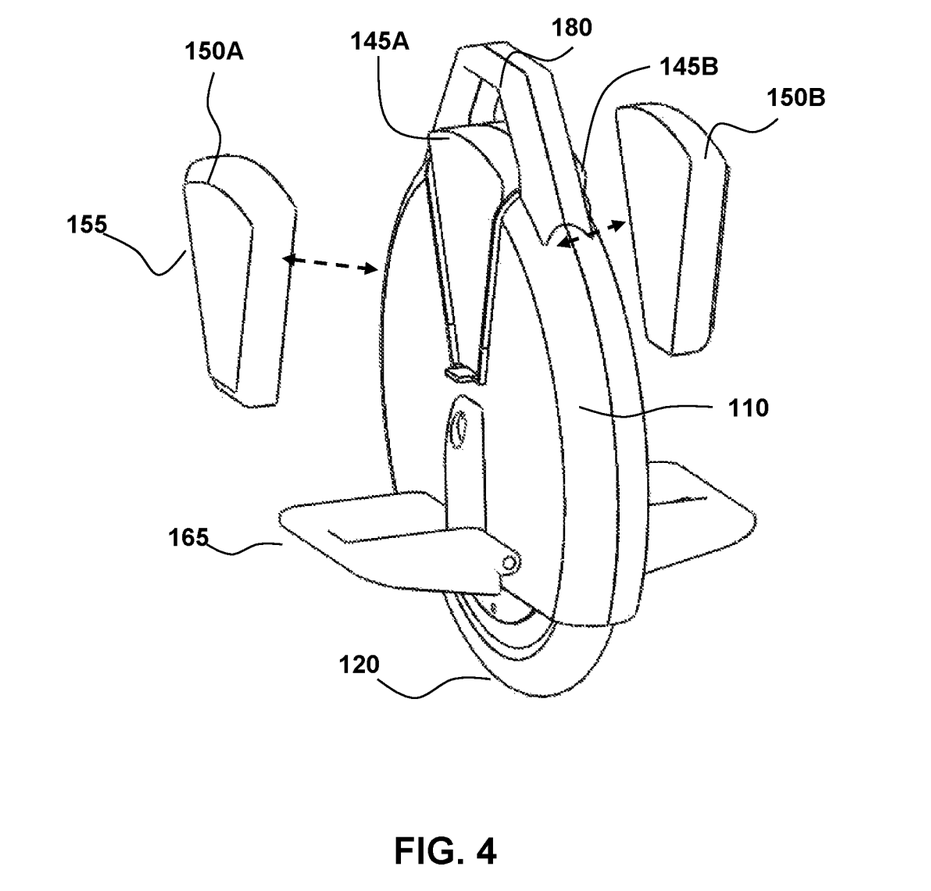
FIG. 4 is an isometric view of an alternative embodiment, wherein the battery compartments are detached from the powered unicycle device.

Turning now for FIG. 4, there is depicted another embodiment (which is slightly modified when compared to the embodiment of FIGS. 1-3), wherein the battery compartments 150A,150B are adapted to be removable from the casing 110. In FIG. 4, the battery compartments 150A,150B are shown to be detached from the unicycle device 100, and the arrows illustrate how the battery compartments 150A, 150B can be attached/detached to/from the casing 110 of the unicycle device 100. It is also noted that the battery compartments 150A,150B of this embodiment are flatter than those of FIGS. 1-3 since they do not comprise a projected section which is adapted to extend over the top the casing 110.

It will be understood that removal of the battery compartments 150A,150B, enables removal of the batteries 145A, 145B housed within the battery compartments 150A,150B. The depicted embodiment thus provides a battery arrangement which can be quickly and easily connected/removed to/from the unicycle device 100 for repair or replacement, for example. Also, by being adapted to be removable from the casing 110, the depicted embodiment may be dismantled to reduce the overall size or profile of the unicycle, thereby improving its portability. The embodiment of FIG. 4 may therefore be considered as being modular in nature.

It is also noted that the foot platforms 165 of this embodiment are different from those of FIGS. 1-3 in that they do not comprise removed portions (or voids).

While specific embodiments have been described herein for purposes of illustration, various modifications will be apparent to a person skilled in the art and may be made without departing from the scope of the invention.

It will be appreciated that a variation on the hubless drive arrangement described above may be based on gear transmission instead of friction. The drive wheels may thus be replaced by circular gears for example, and accordingly the inner rim of the hubless wheel may have alternating protruding and indented segments (i.e. "teeth"). Other embodiments may not employ a hubless wheel, but may instead employ a 'hubbed' wheel.

A retractable carrying strap may also be provided and attached to the top of the casing, for example. Such a carrying strap may be used to carry the unicycle, for example over the shoulder of user. A hook may be provided on the bottom of the case to create rucksack-like belts from the carrying strap.

Further, in some embodiments, the battery compartment(s) may extend beyond the circumferential extent of the generally circular casing, thus meaning that the size of the battery compartment(s) may not be generally restricted by the circumference of the wheel or casing.

Figure 5:
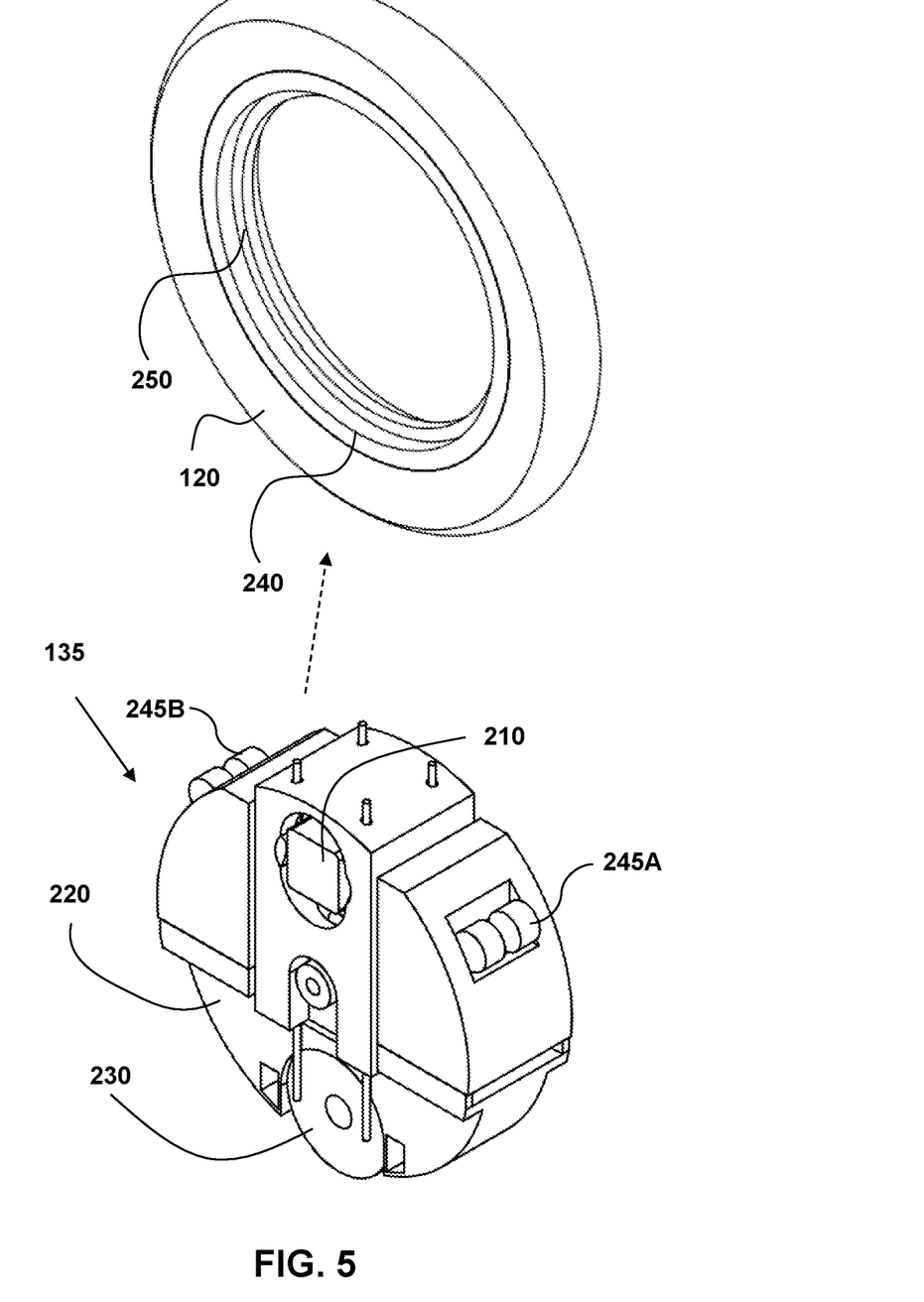
FIG. 5 is an exploded diagram of components internal to the powered unicycle device of FIG. 1.

FIG. 5 illustrates internal components of the powered unicycle device described with reference to FIG. 1. In particular, there is illustrated the balance control system 210 adapted to maintain fore-aft balance of the unicycle device, the wheel 120 and the drive arrangement 135.

A motor 220 (of the drive arrangement) drives one or more drive wheels 230 positioned at the lowermost point along the inner rim 240 of the wheel 120.

The drive arrangement 135 includes pairs of guide wheels 245A, 245B attached to the rim of the drive arrangement 135. A rib 250 is provided around the inner rim 240 of the wheel 120 and fits into a gap between the guide wheels of each pair. The guide wheels are therefore adapted to contact with the inner rim of wheel 120 where they spin along with wheel 120 and hold wheel 120 in place by way of the rib.

The invention claimed is:

1. A self-balancing powered unicycle device, comprising:
   a single wheel;
   a motor adapted to drive the single wheel;
   a balance control system adapted to maintain fore-aft balance of the powered unicycle device;
   at least one foot platform for supporting a user of the powered unicycle device;
   a casing adapted to cover at least a portion of an outer rim of the single wheel; and
   at least one energy storage device compartment protruding outward from a side of the casing and adapted to house an energy storage device for powering the powered unicycle device;
   wherein the at least one energy storage device compartment is adapted to be removable from the casing so as to enable removal of the energy storage device from the powered unicycle device; and
   wherein, for each energy storage device compartment of the at least one energy storage device compartment, the energy storage device compartment has a width, and is shaped such that the width of the energy storage device compartment at an end closest to a rotational axis of the single wheel is less than a width of the energy storage device compartment at an end farthest from the rotational axis of the single wheel.

2. The powered unicycle device of claim 1, wherein the at least one energy storage device compartment is substantially V-shaped.

3. The powered unicycle device of claim 1, wherein the at least one energy storage device compartment has a trapezoidal or kite shape.

4. The powered unicycle device of claim 1, wherein an outwardly facing surface of the least one energy storage device compartment comprises a yielding material.

5. The powered unicycle device of claim 1, wherein said single wheel is hubless, and wherein the powered unicycle device further comprises at least one drive wheel driven by said motor and in contact with an inner rim of the single wheel.

6. The powered unicycle device of claim 1, wherein the energy storage device comprises at least one of: an electrical battery; an electrochemical battery; a mechanical energy storage device; or a capacitor.

* * * * *